May 19, 1970  G. D. COCHRAN ET AL  3,512,464
DEVICE FOR REMOVING THE EFFECT OF BLURRING IN PHOTOGRAPHY
Filed Nov. 21, 1966  3 Sheets-Sheet 1
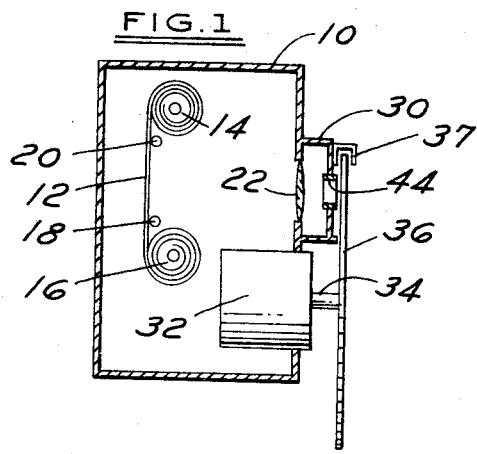
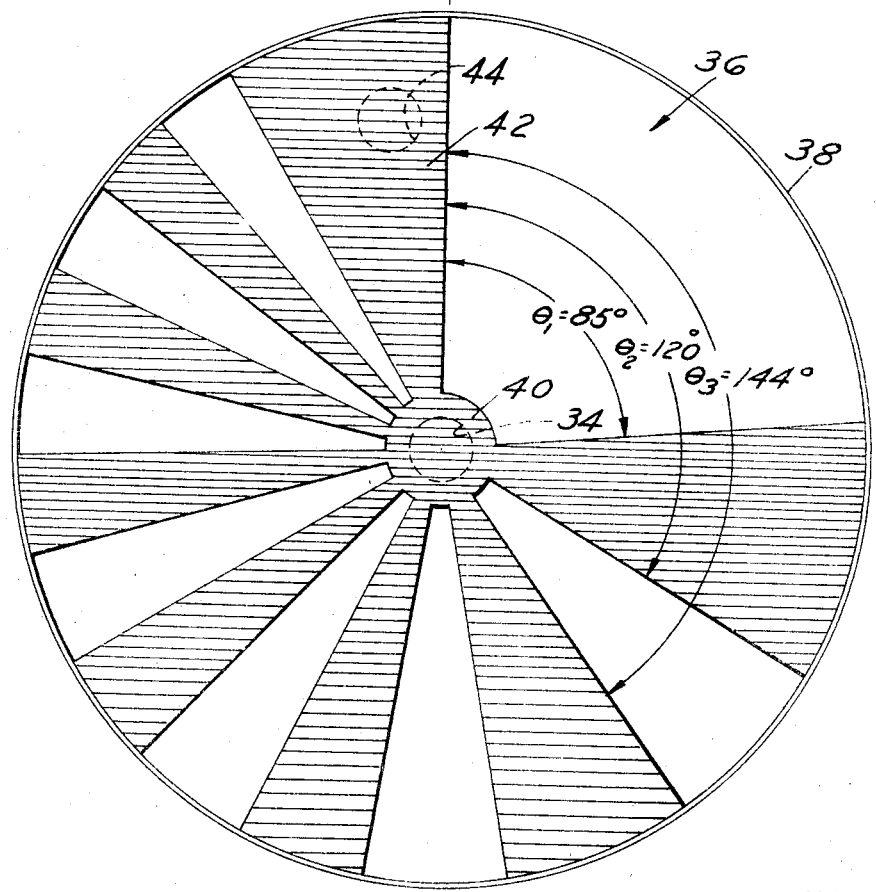
INVENTORS
IRVIN W. KAY
GARY D. COCHRAN
BY
Barnes, Kisselle, Raisch & Choate
ATTORNEYS INVENTORS
IRVIN W. KAY
GARY D. COCHRAN
BY
Barnes, Kisselle, Raisch & Choate
ATTORNEYS

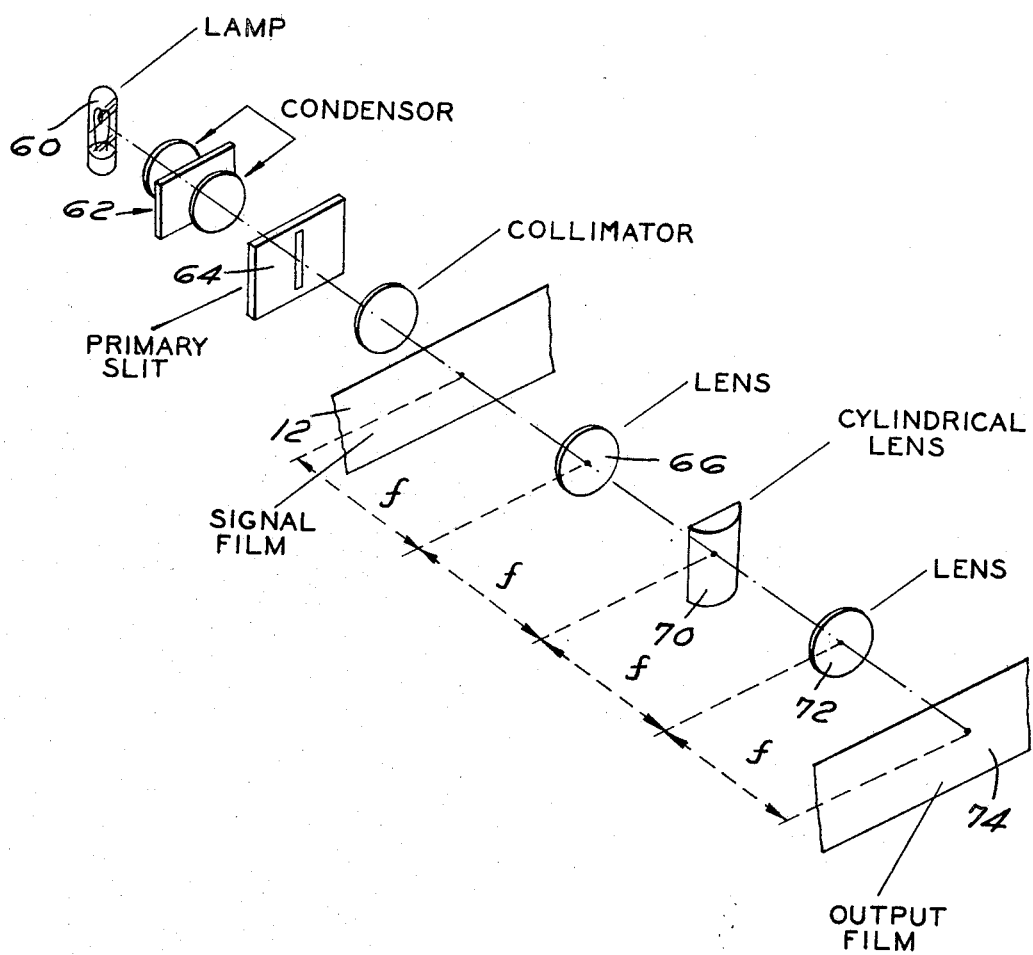

United States Patent Office 3,512,464
Patented May 19, 1970

3,512,464
DEVICE FOR REMOVING THE EFFECT OF BLURRING IN PHOTOGRAPHY
Gary Don Cochran and Irvin W. Kay, Ann Arbor, Mich., assignors to Conductron Corporation, Ann Arbor, Mich., a corporation of Delaware
Filed Nov. 21, 1966, Ser. No. 595,857
Int. Cl. G03b 41/04
U.S. Cl. 95—11                  5 Claims

ABSTRACT OF THE DISCLOSURE

A camera system for creating image to remove the effect of relative motion between light sensitive film and and object to be photographed in which the light aperture of a camera is associated with a light modulator to modulate light from the object in a predetermined and progressively decreasing series of light passes so that the film as exposed has a plurality of light images with an imposed frequency modulation, and a system for recreating unblurred image utilizing a spatial frequency transform of the recorded image and filter means to select certain of the frequencies in the modulationn to create an unblurred image.

---

This invention relates to a device for removing the effect of blurring in photography and more particularly to a system of photography which permits the production of pictures with satisfactory clarity even under conditions of very high relative motion between the subject of the photograph and the camera. This may result from a moving subject or a moving camera or both. The system contemplates not only a modified camera system but also a special read-out apparatus which can utilize spatial filtering to remove blurring effect.

It is known (U.S. Pat. No. 2,357,331, dated Sept. 5, 1944), to utilize extremely high shutter speeds to reduce blurring in the photographing of moving objects or to photograph a stationary object from a camera in a moving vehicle. Another attempt to remove blurring has been to move the film at a sinusoidal varying rate in synchronism with the shutter operation—U.S. Pat. No. 3,007,383 of Nov. 7, 1961; U.S. Pat. No. 2,474,323 of June 28, 1949.

It has been found that it is impossible to resolve a smeared or blurred picture back to clarity. Also high resolution film in general is a slow film which calls for longer exposure. Accordingly, a fast shutter speed or a sinusoidally moving film is not a solution to the problem.

Accordingly, it is an object of the present invention to provide a light control which will permit a longer total exposure and thus permit the use of high resolution film.

It is a further object of the present invention to utilize a light modulator in conjunction with a standard camera aperture and shutter such that longer total exposures can be used in connection with relative-motion photography without interfering with clarity.

It is also an object of the present invention to provide a system by which the effect of relative motion between film and subject can be removed in read out from the photograph by an optical filtering process.

Other objects and features of the invention relating to details of construction and operation will be apparent in the following description and claims in which the principle of the invention and the manner of use are set forth together with the best mode presently contemplated for accomplishing the objects of the invention.

Drawings accompany the disclosure and the various views thereof may be briefly described as:

FIG. 1, a sectional view of a camera illustrating a modulation system in diagrammatic presentation.

FIG. 2, is a view of a modulation disc which can be utilized with a camera.

Figure 3:
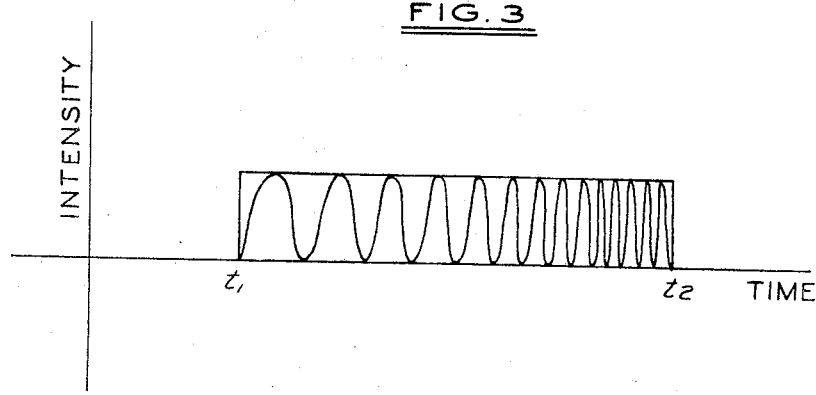

FIG. 3, a coordinate illustration of a modulation effect to be created.

Figure 4:
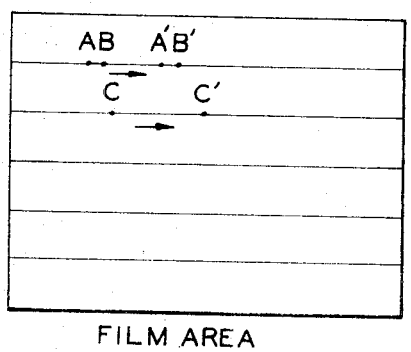

FIG. 4, a diagrammatic illustration of a film area.

Figure 5:
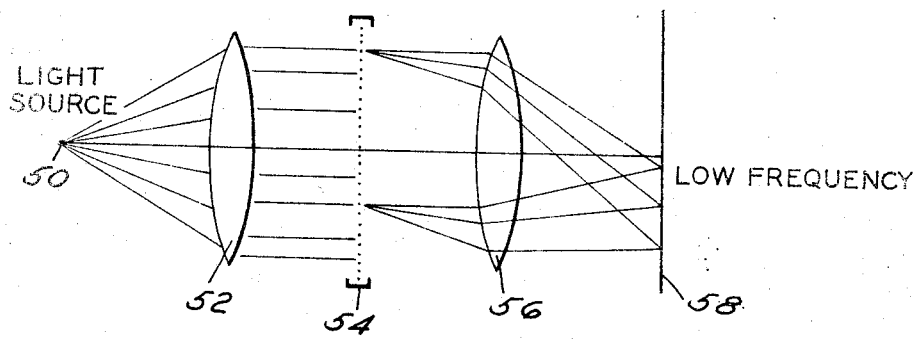

FIG. 5, a diagrammatic illustration of a spatial filtering system.

FIG. 6, an optical system to accomplish the inverse filtering necessary to remove selected modulation.

In FIG. 4, there is shown a representation of a film area which is exposed in a camera upon the opening of the shutter. If the camera is moving relative to the subject any particular image point A will move across the film to A' during the time the shutter is open. Similarly, points B and C move to points B' and C' respectively. In a standard camera, these points create a smear or blur on the film which is impossible to remove by any optical reversing process. The present invention contemplates a modulation of the light input according to a prescribed plan in order that a subsequent optical treatment of the image can remove the smear effect.

In FIG. 3, on time-intensity coordinates, is shown one system modulation. At a certain time $t_1$ the shutter opens to admit light (image) into the camera. At the same time, and during the shutter opening time to the point $t_2$, a modulation is imposed on the entering light. A possible modulated pattern is shown by the sinusoidal curve starting at $t_1$, and terminating at $t_2$. Each particular image point will, of course, be modulated similarly during the shutter opening. All of the image points entering the camera during the open shutter time will be modulated with various frequencies related to their appearance in point of time.

The system for obtaining the proper photographic output from a camera which is taking pictures of a relatively moving object can be described in terms of the following mathematical presentation.

If the intensity of the light signal entering the camera's aperture when there is no relative motion between the camera and the subject is represented by $f(x, y)$ at the image plane, and if the camera is moving with a velocity $v$ in the $y$ direction, then intensity during the motion can be represented by $f(x, y+vt)$ at any instant of time, where shutter time is represented by $t$ and the relative velocity of the camera and the subject is represented by $v$. The integrated intensity which contributes to the photograph during the time the shutter is opened will then be given by $$\text{Intensity } \alpha \int_0^T f(x, y+vt)\,dt \alpha \int_0^Y f(x, y+\tau)\,d\tau \quad (1)$$

If the light is modulated in time by a function $m(t)$, this integrated intensity will be $$\text{Intensity } \alpha \int_0^Y m\left(\frac{\tau}{v}\right) f(x, y+\tau)\,d\tau$$

In these formulas, the expression $f(x, y+vt)$ is the modulation of light coming through the camera that gives the image. If $m(t)$ is equal to $\sin^2 at^2$ which is the modulation given by the rotating shutter, $a$ being the constant which will depend on the speed of the shutter, the right-hand side of Equation 2 has the form of a convolution integral, and, therefore, the Fourier transform thereof is the product of the transform of the original intensity function $f(x,y)$ and that of the modulation function truncated by the time interval during which the shutter is open.

If the Fourier transform of the truncated modulation function does not vanish in that part of the frequency domain of interest for the amplitude function corresponding to the photograph image desired, an inverse filter which will cancel the effect of the modulation and smearing action can be utilized.

In order to guarantee that this is achieved, it is necessary only to select a modulation function which has a frequency bandwidth large enough to cover the band of interest for the photographic image.

A modulating waveform which is easy to generate with the desired property is the chirp or linearly frequency modulated signal cos $(\alpha t^2)$. Since the modulation function must be real and positive, it will be necessary to add a constant bias level. The required inverse filter has a frequency response which is the reciprocal of the Fourier transform of the modulation function.

One apparatus for obtaining a frequency modulation is illustrated diagrammatically in FIG. 1 where a camera is shown with an enclosure 10 having a film 12 mounted on a take-up spool 14 and a pay-out spool 16. Idle rollers 18 and 20 are used to stabilize that portion of the film which is receiving an image. A standard and suitable camera lens 22 is provided in the light-tight camera enclosure and suitable iris and shutter mechanism is illustrated diagrammatically at 30. Mounted in the camera housing is a small drive motor 32 having a drive shaft 34 on which is mounted a reticle plate 36.

This plate is shown in FIG. 2 as being composed of an outer ring 38 with a plurality of solid portions separated by open portions, the solid portions being joined at the outer periphery to the ring 38 and at the center of the plate in an integral central section 40 on which the plate mounts on shaft 34. The reticle is thus a series of alternately opaque and transparent portions, the beginning of each bar (the $n$th bar) being specified by an angle $\phi$. Thus $X_n = K_1\sqrt{n}$ where $\phi_n = K_2\sqrt{n}$. FIG. 2 shows a typical reticle with eight opaque and eight transparent bars ($n_{max}=16$).

In practice, more bars might be used to modulate the picture. The resolution will increase with increasing $n_{max}$. An extra bar 42 is provided to shutter the camera off between exposures, the aperture 44 of the camera being shown in dotted lines in FIG. 2 behind the bar 42 between exposures. There are a number of frequency modulation devices that might serve this same function such as Kerr cell or an electrically driven high-speed shutter properly programmed or possibly a potassium dyhydrogen phosphate crystal modulator.

It is possible also to use a linear translation of an apertured shutter rather than the rotating shutter illustrated. With the device illustrated in FIG. 2, the following $\phi$ values are $n=16\phi_{max}=340°$

| | | | |
|---|---|---|---|
| $\phi_1=85°$ | $\phi_5=190°$ | $\phi_9=255°$ | $\phi_{13}=306°$ |
| $\phi_2=120°$ | $\phi_6=208°$ | $\phi_{10}=269°$ | $\phi_{14}=318°$ |
| $\phi_3=144°$ | $\phi_7=225°$ | $\phi_{11}=282°$ | $\phi_{15}=329.5°$ |
| $\phi_4=170°$ | $\phi_8=240°$ | $\phi_{12}=294°$ | $\phi_{16}=340°$ |

With the arrangement shown, it is possible to balance the speed of modulation with the total amount of light desired. The modulator apparatus shown permits more exposure of the film without destructive blurring due to the relative motion. In the process of viewing, there will be a refocus for each shutter speed and the higher the frequency the shorter the focal length of each zone plate.

The resulting film exposure from the frequency modulation is a plurality of light images reflected from the selected subject and recorded on the film each with an imposed frequency modulation.

From the film a reconstruction of an unblurred image can be obtained. To accomplish this, use is made of a spatial frequency filter. It is known that a prism will divide light waves into a spectrum of various wave lengths. It is also possible to separate an image, especially an image on a transparent film into a spectrum on the basis of spatial frequency. As shown in FIG. 5, a light source 50, preferably a coherent light source, collimated through collimator 52 is directed to a grating 54 which may be a film having many different spatial frequencies contained thereon, i.e., images recorded in light and dark patterns of different spacings. In the present invention, the spacings result from the light modulation. When the light passes through the film, it divides the various frequencies on the basis of lows and highs, the lows appearing in a spectrum near the center and the intermediates and highs appearing respectively farther from the center. This is sometimes referred to as a Fourier transform. In FIG. 5, a lens 56 images the frequencies at a transform plane 58. At this plane 58 or at another image point in the optical system, it is possible to place a filter to remove such frequencies as are selected to be removed.

According to the present invention, an inverse filter is selected. For particular modulation inputs, a proper inverse filter may be created and utilized. The filter will vary the phase and amplitude of the incident light according to the required inverse filter amplitude variations. In the particular modulation above described, the proper inverse filter is a cylindrical lens.

In FIG. 6, an optical system is illustrated to perform the inverse filtering on the particular frequency modulation disclosed. A lamp source 60 projects light through a condensor lens assembly and thence through a primary slit shield 64. A collimator lens directs the light through the signal film taken from the camera and having recorded thereon all of the frequency modulated light images. The resulting information is transferred to a lens 66, a focal length from the film 12 and a focal length from a cylindrical filter lens 70 at the spectrum plane of the system. The filtered information proceeds to lens 72 a focal length away from the spectrum plane and is displayed at a plane 74 where a recording device may be located such as a sensitive film.

Thus, utilizing the proper inverse filter, the light modulated input information can be treated with the inverse filter to remove all but the desired frequencies and a sharp image with good resolution can be obtained utilizing such exposure time as is desirable for high resolution film.

What is claimed as new is as follows:

1. A camera system for removing the effect of relative motion between film and object during exposure which comprises, in connection with a camera having a film carrier and a light opening, a light modulator for the opening to modulate light reaching the lens according to the relation $$\alpha \int_0^Y m\left(\frac{\tau}{v}\right) f(x, y+\tau) d\tau$$

where $m$ is chosen modulation and $f$ is the unmodulated light reaching the camera film, and a spatial filter system to obtain selected frequencies to create a final image free of blur.

2. An image creating system to remove the effect of relative motion between a recording area and a subject which comprises an image recording area responsive to reflective light images, an aperture for admitting light to said area, means to modulate light through said aperture in a predetermined frequency modulation in a progressively decreasing series of light passes to establish a recorded image having information recorded in a plurality of frequencies, optical means to utilize said recorded image to establish a spatial frequency transform, and inverse filter means to permit selection of certain of said frequencies in said modulation in said transform to create an unblurred image of said subject.

3. A camera system for removing the effect of relative motion between film and object during exposure which comprises, in connection with a camera having a film carrier and a light opening, a light modulator for the opening to modulate light reaching the lens according to the relation $$\alpha \int_0^Y m\left(\frac{\tau}{v}\right) f(x, y+\tau) d\tau$$

where $m$ is chosen modulation function and $f$ is the unmodulated light reaching the camera film, and a spatial filter system to obtain selected frequencies to create a final image free of blur, the spatial filter system comprising an optical system to create a Fourier transform at an image plane from the film containing the light modulated image information in spatial frequency, and an inverse filter at said image plane to select desired frequencies from said transform.

4. A camera system for removing the effect of relative motion between film and object during exposure which comprises, in connection with a camera having a film carrier and a light opening, a light modulator for the opening to modulate light reaching the lens according to the relation $$\alpha \int_0^Y m\left(\frac{\tau}{v}\right) f(x, y+\tau) d\tau$$

where $m$ is chosen modulation function and $f$ is the unmodulated light reaching the camera film, and a spatial filter system to obtain selected frequencies to create a final image free of blur, the spatial filter system comprising an optical system to create a Fourier transform at an image plane from the film containing the light modulated image information in spatial frequency, and an inverse filter at said image plane to select desired frequencies from said transform, the said inverse filter acting to correct both phase and amplitude to produce an unblurred image at outputs.

5. A camera system for creating an image which can permit the removal of the effect of relative motions between film and object during exposure which comprises, in connection with a camera having a film carrier and a light opening, that improvement which comprises the addition of a light modulator for the opening operable during the open shutter time to modulate light from the object in a predetermined and progressively decreasing series of light passes to effect a film exposure as a plurality of light images with an imposed frequency modulation, said modulator comprising a moving opaque shield having a plurality of spaced transparent portions arranged in decreasing size to pass in front of said light opening, and means to move said shield past said light opening at a predetermined speed to effect a film exposure as a plurality of light images with an imposed frequency modulation, and a spatial filter system to obtain selected frequencies to create a final image free of blur comprising a cylindrical lens serving as an inverse filter to remove unwanted frequencies.

References Cited

UNITED STATES PATENTS

| | | | |
|---|---|---|---|
| 3,090,281 | 5/1963 | Marechal | 96—44 X |
| 1,067,750 | 7/1913 | Niles | 352—210 |

JOHN M. HORAN, Primary Examiner